United States Patent [19]

Tanguay

[11] Patent Number: 5,355,920
[45] Date of Patent: Oct. 18, 1994

[54] FELLING AND DELIMBING APPARATUS ALLOWING TO DELIMB TREES IN LENGTH AND ITS METHOD OF USE

[76] Inventor: Jacques Tanguay, 74, 6th Ave., St-Prime, Canada

[21] Appl. No.: 991,843

[22] Filed: Dec. 16, 1992

[30] Foreign Application Priority Data

Dec. 16, 1992 [CA] Canada .................. 2057680-4

[51] Int. Cl.⁵ .................................. A01G 23/08
[52] U.S. Cl. ........................ 144/338; 144/2 Z; 144/3 D; 144/34 E; 144/246 R; 144/246 F; 144/339; 144/343
[58] Field of Search .......... 144/2 Z, 3 D, 34 R, 144/34 E, 246 R, 246 D, 246 E, 246 F, 335, 336, 338, 339, 343

[56] References Cited

U.S. PATENT DOCUMENTS

| | | | |
|---|---|---|---|
| 3,542,099 | 5/1968 | Gibson | 144/339 |
| 3,735,786 | 5/1973 | Vit | 144/338 |
| 3,981,336 | 7/1976 | Levesque | 144/3 D |
| 3,999,582 | 12/1976 | Allen et al. | 144/3 D |
| 4,034,785 | 7/1977 | Tucek | 144/2 Z |
| 4,779,654 | 10/1988 | Casperson et al. | 144/338 |
| 4,919,175 | 4/1990 | Samson | 144/2 Z |
| 4,922,976 | 5/1990 | Hacker | 144/3 D |
| 4,972,890 | 11/1990 | Isley | 144/246 C |
| 4,981,163 | 1/1991 | Westlund | 144/3 D |
| 5,148,843 | 9/1992 | Cote | 144/2 Z |
| 5,163,489 | 11/1992 | Ketonen | 144/338 |
| 5,219,010 | 6/1993 | Eriksson | 144/2 Z |

OTHER PUBLICATIONS

Advertising document of Forano concerning a felling head.

*Primary Examiner*—W. Donald Bray
*Attorney, Agent, or Firm*—Merchant & Gould Smith, Edell, Welter & Schmidt

[57] ABSTRACT

The invention relates to an improvement in a felling and delimbing apparatus having a head for felling and delimbing trees; a frame, at least two grasping jaws and, delimbing knives mounted on said frame and/or on said grasping jaws, and first/and second cutters for cutting the trunk of a tree, a platform which is pivotally mounted on a frame of the vehicule for movement around a vertical pivoting axis; a first and second booms pivotally connected together by a first pivot defining a substantially horizontal pivoting axis, the first boom being also pivotally connected with the platform by a second pivot defining a substantially horizontal pivoting axis, the second boom being also pivotally connected with a first supporting member by a third, pivot defining a substantially horizontal pivoting axis; the frame of the head and the first supporting member are pivotally connected together by a fourth pivot defining a pivoting axis that is substantially not parallel with aforesaid horizontal axis, that means are provided to selectively move and position the head around the fourth pivoting axis.

14 Claims, 12 Drawing Sheets

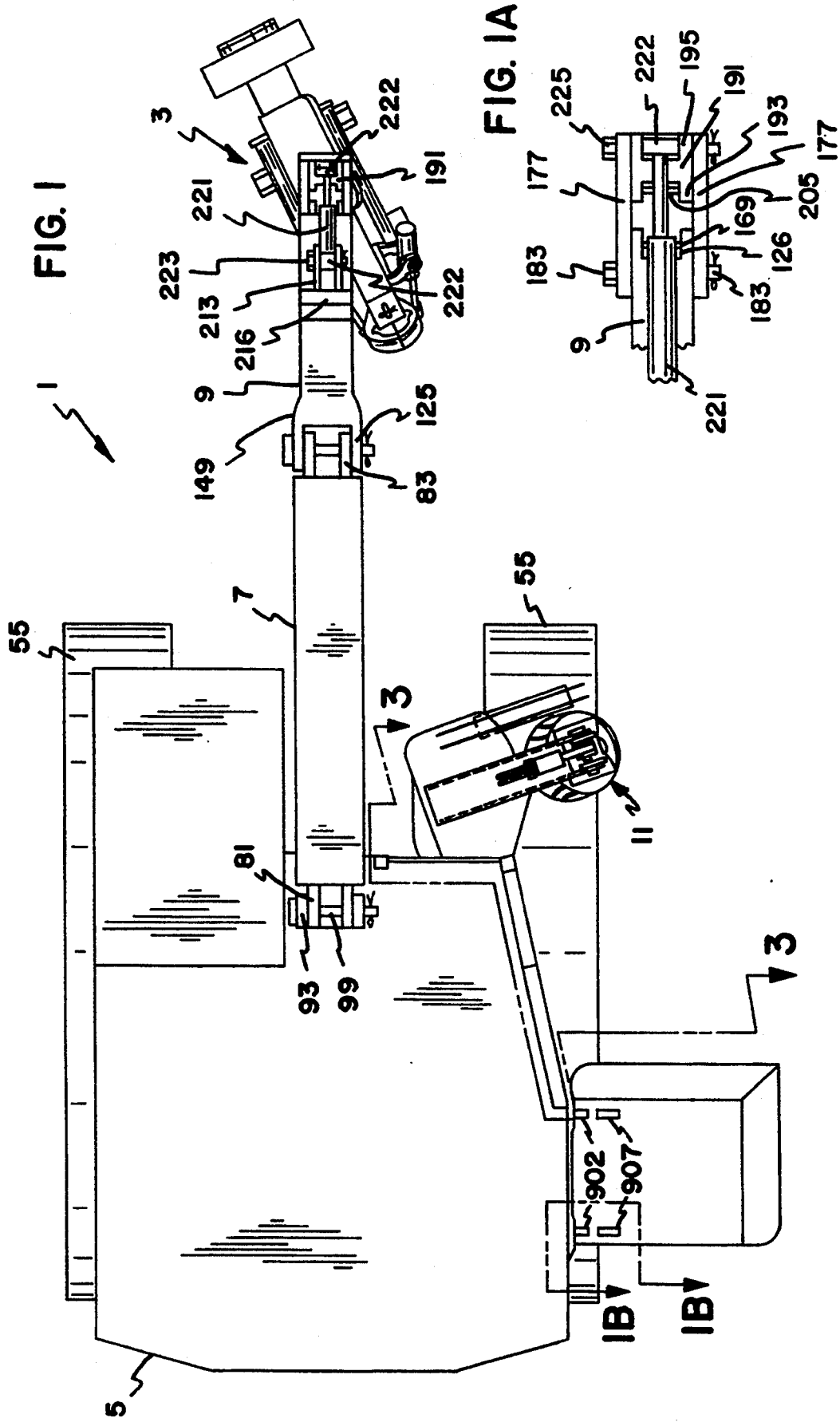

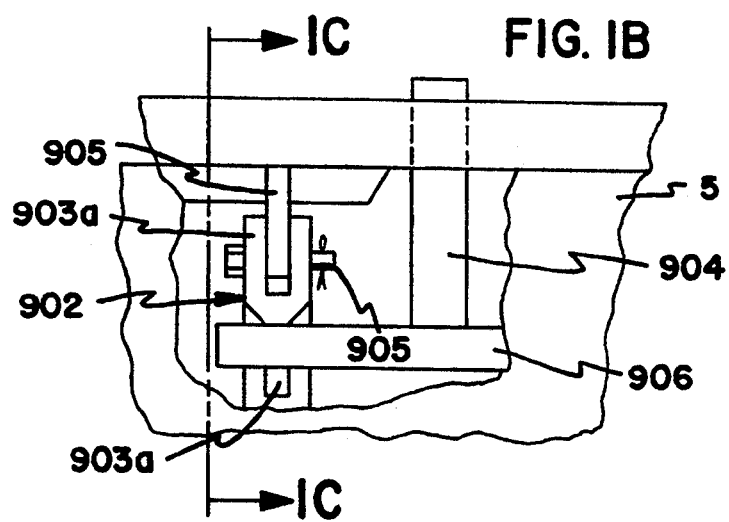
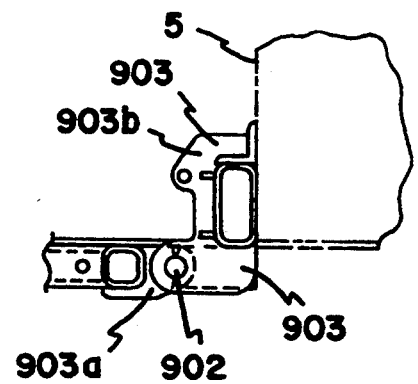
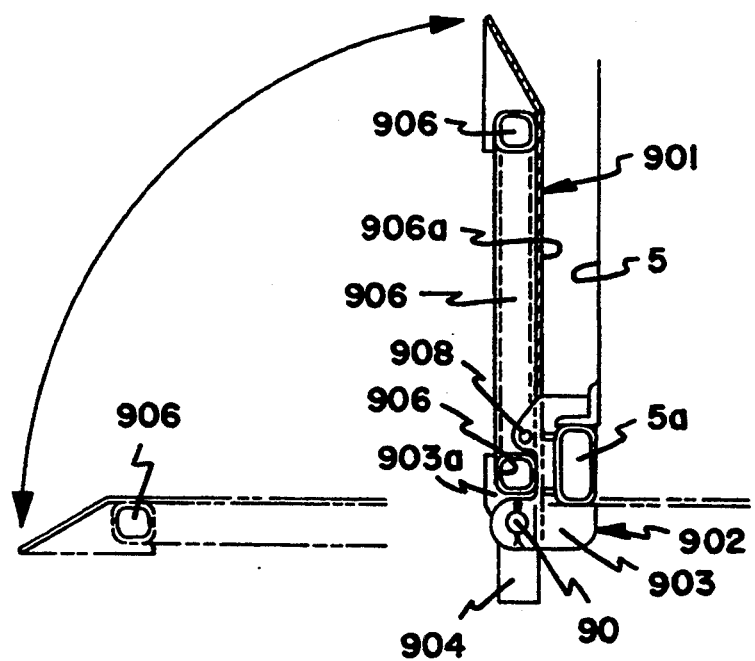

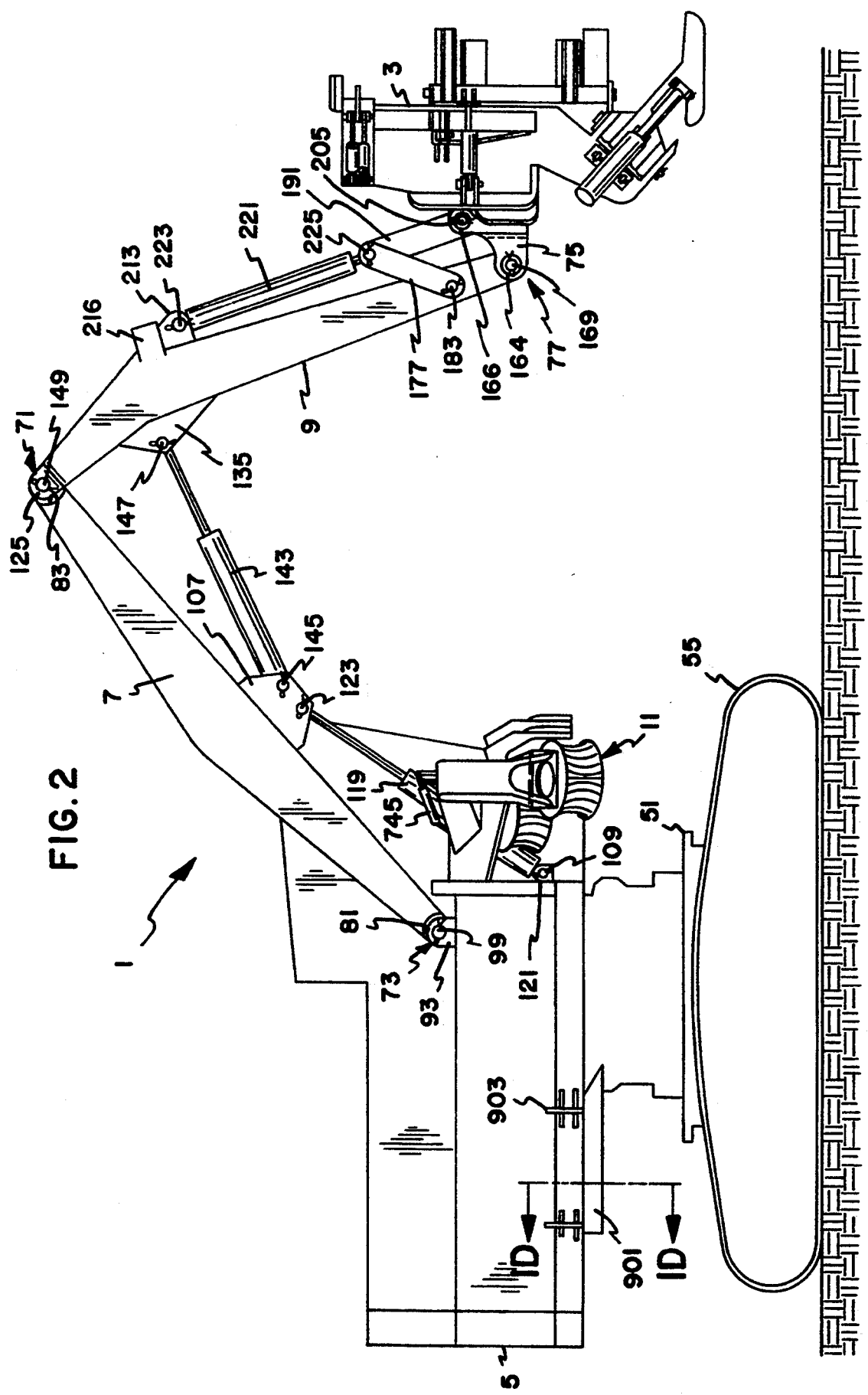

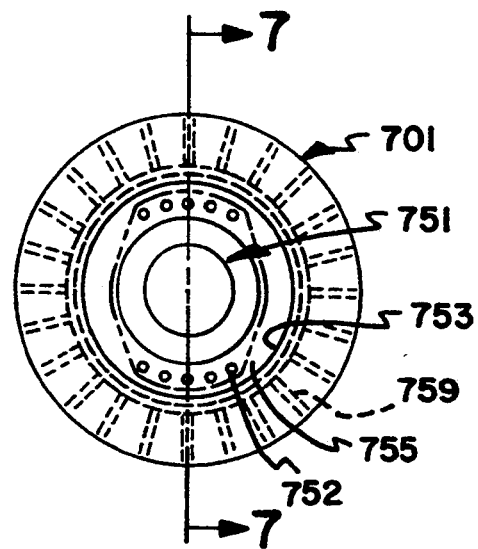
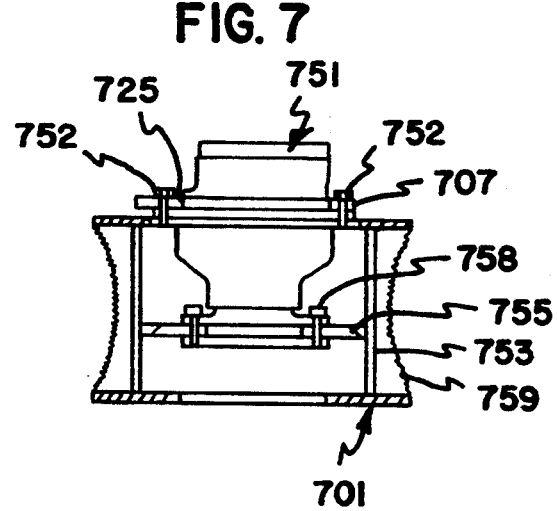

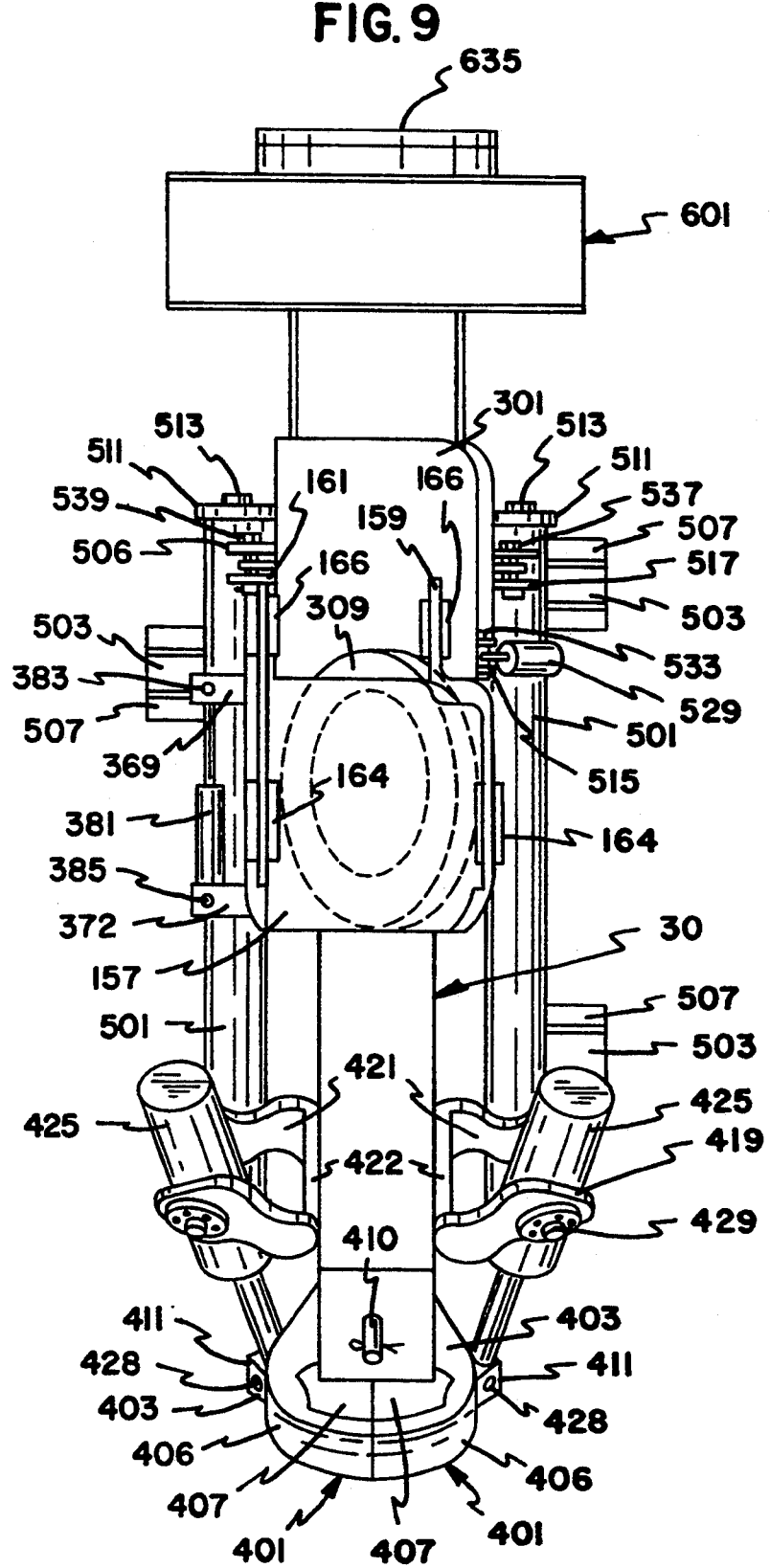

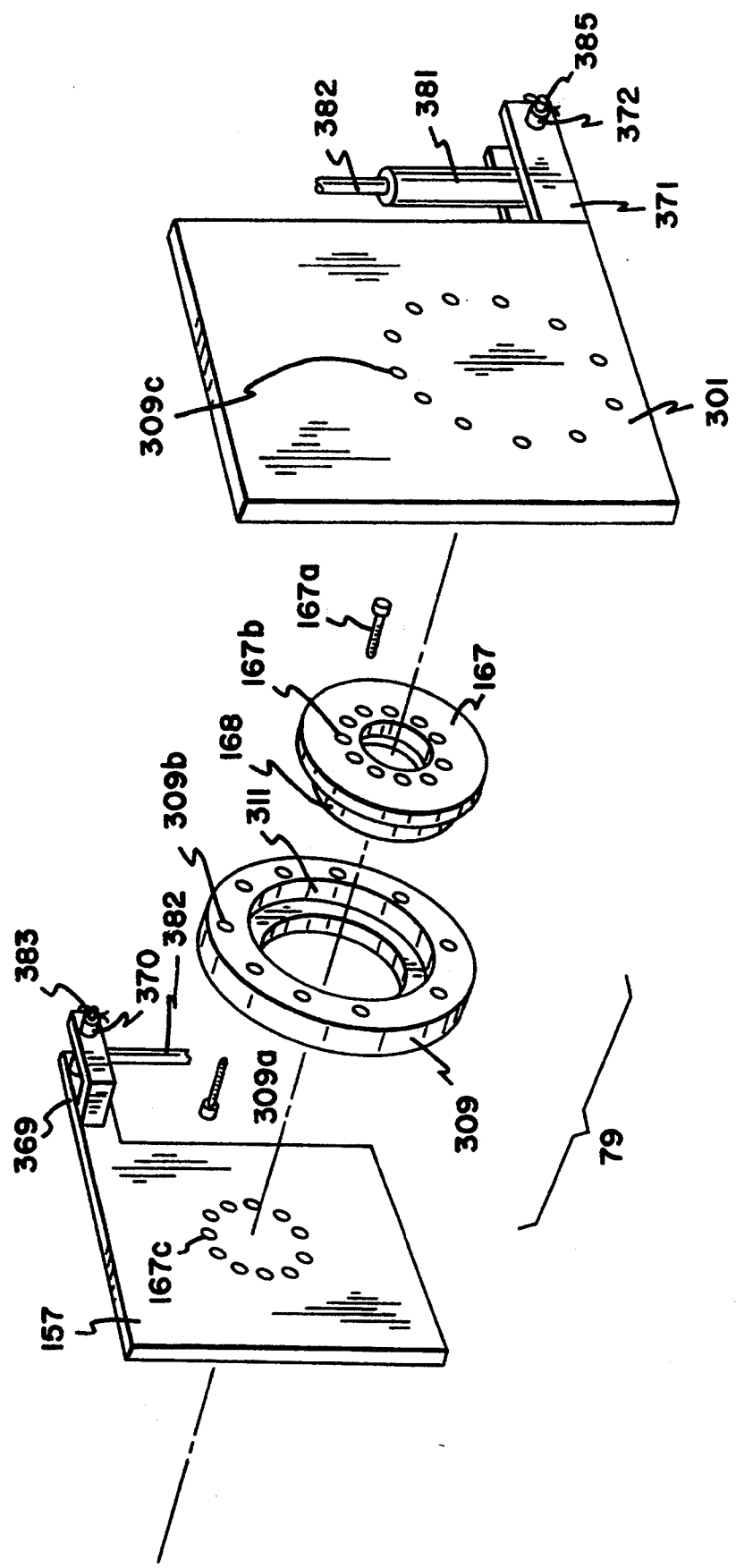

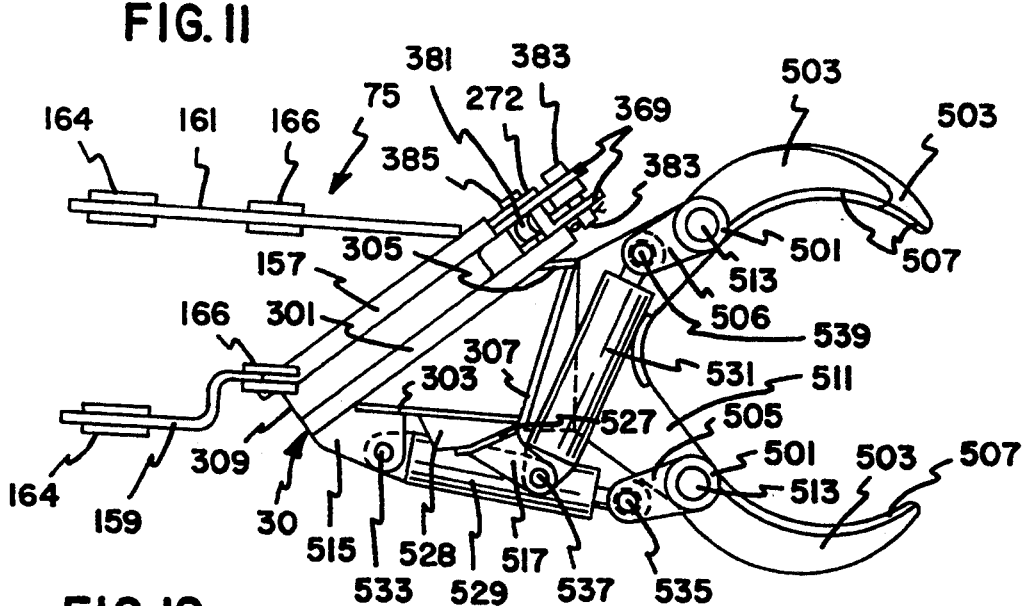
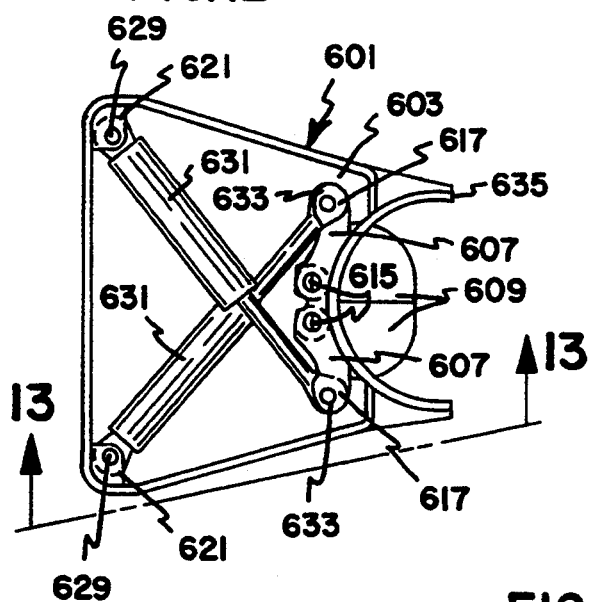
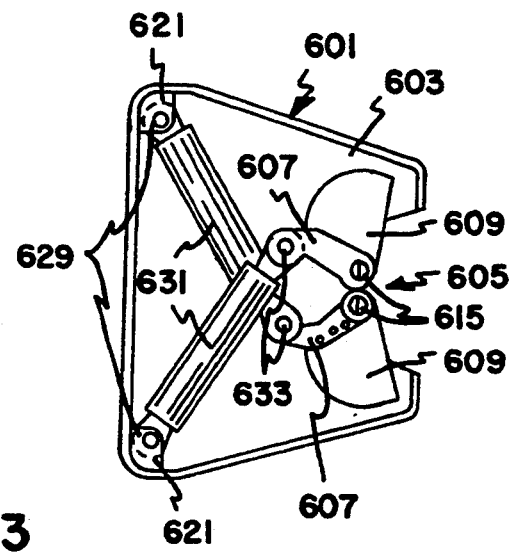
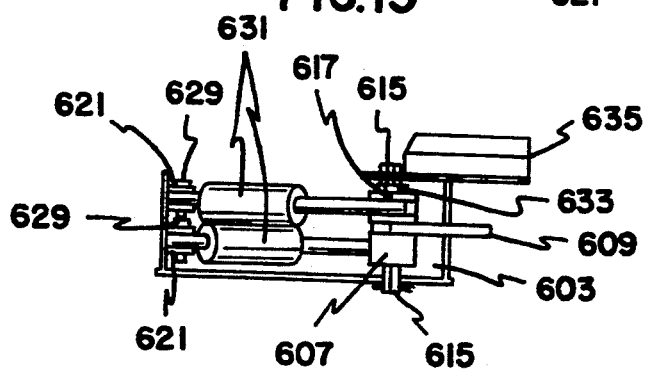

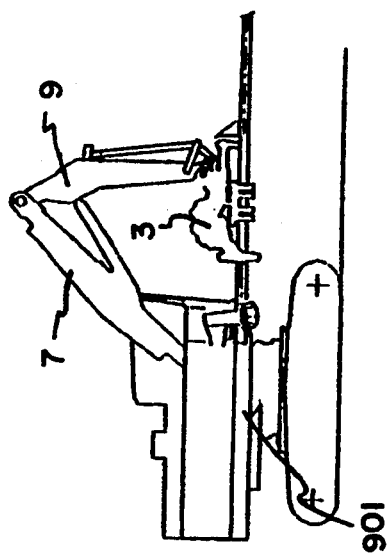
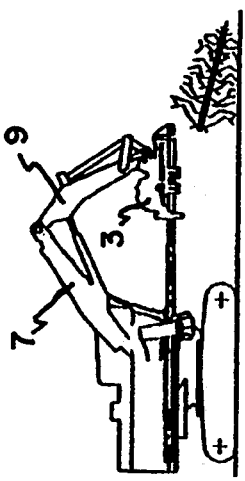
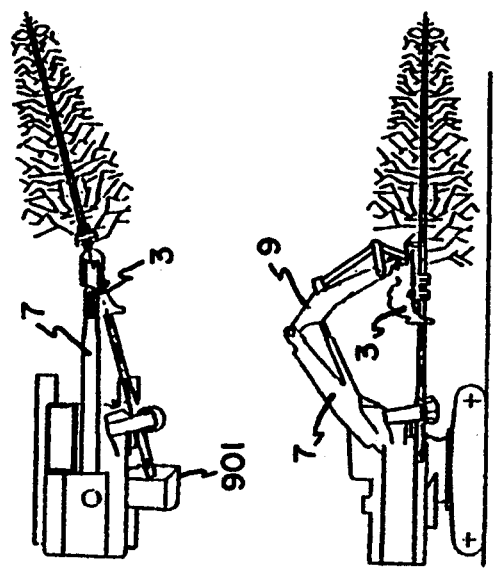

FELLING AND DELIMBING APPARATUS ALLOWING TO DELIMB TREES IN LENGTH AND ITS METHOD OF USE

BACKGROUND OF THE INVENTION

1. Field of the Invention

The present invention relates to an improvement in an apparatus intended to fell and delimb trees in order to delimb said trees in length. Furthermore, the invention relates to a method of use of the aforesaid improved apparatus.

2. Description of the Prior Art

Since several years, forest and paper companies ought to adapt their exploitation policies toward the regeneration of forest and the protection of the environment. U.S. Pat. Nos. 3,981,336, 3,999,582 and 4,779,654 describe felling and delimbing apparatuses of the type comprising a vehicle provided with booms or levers and with a felling and delimbing head. In each of these patents, the felling and delimbing head is provided with means for driving the trunk of a tree along a longitudinal axis of the head and bringing branches against delimbing knives of said head. However, prior art apparatuses cannot delimb trees in length, they delimb a segment of the trunk and cut the delimbed segment to define a log of 4, 8 or 12 feet, and repeat the operation until the top of the tree is reached. Furthermore, the mounting of driving means on the felling and delimbing head, on one hand, generate a substantial increase of weight for said head and involve the use of strong booms or levers, and on the other hand, increase the risk of mechanical failure of said driving means because it is known that felling and delimbing head are subjected to very tough conditions. In the province of Québec (CANADA), for example, 80% of forest companies are processing trees in length rather than in logs of 4,8 or 12 feet. Therefore, because actual felling and delimbing apparatuses do not allow to process trees in length in the forest, forest companies are actually delimbing trees along access roads with delimbing apparatuses of the type described in U.S. Pat. Nos. 4,919,715, 4,922,976 and 4,981,163. Therefore, the processing of wood always involve a succession of operations, that is: Felling trees; Carrying felled trees along an access road; delimbing trees along said access roads; optionally cutting trunks in logs; loading trucks with trunks or logs. Delimbing operations generate a gathering of branches along access roads and forest companies have to dispose of them (by burning or spreading) in order to facilitate subsequent silviculture works. Also, carrying whole trees in forest to an access road increases exploitation costs.

Therefore, there is a strong need for a felling and delimbing apparatus allowing to delimb trees in length on the site.

SUMMARY OF THE INVENTION

A first object of the invention is to provide an apparatus for felling and delimbing trees in length on the site.

Indeed, such an apparatus would allow forest companies requiring to process trees in length, to avoid transportation of whole trees along access roads and gathering of branches along said access roads. Furthermore, delimbing operations on the site will contribute to promote a self-regeneration of forest, make easier the work of lumpers in savanas and reduce damages to the soil. Also, when machineries are moved on soft ground, branches can be used to form a riding bed on which said machineries may pass, and the effective load capacity of truck or carrier in forest is increased because branches are about 30% of the weight of a tree. Also, delimbing operations in forest will allow to avoid lumpers to burn branches (fire hazard) and/or to spread them in order to avoid gathering.

Another object of the invention is to provide an apparatus in which driving means cannot be subjected to very tough conditions to which the felling and delimbing head is subjected. This will contribute to minimize mechanical failure of said driving means.

Another object of the invention is to provide an apparatus in which the felling and delimbing head is not too heavy to thereby avoid the use of stronger booms or levers and reduce the whole weight of the apparatus. This advantage becomes significant when the apparatus is working on soft ground.

Another object of the invention is to provide a method of use of aforesaid apparatus in order to carry out on the site the steps of felling and delimbing of trees. Such a method will contribute to lower the risk of fire and avoid lumpers to spread branches away from sides of access roads.

Another object of the invention is to provide an apparatus and a method in which bowing of the trunk of the tree during delimbing is minimized, in order to avoid said trunk to hit the ground and jam the operation.

Another object of the invention is to provide an apparatus and a method in which jamming because delimbing knives hit a knot or for any reasons, is minimized because delimbing can be alternatively carried on thanks to movements of booms, to thus minimize the risk to damage the fibers of wood.

Another object of the invention is to provide an apparatus and a method in which stress on the booms are reduced because during delimbing operations the weight of the felled tree is supported on two distinct points spaced apart from each other, one of these points being positioned on the platform of a vehicle while the other is defined to the felling and delimbing head. Also, the felling and delimbing head may be lighter than actually known processing head.

Another object of the invention is to provide an apparatus and a method allowing to carry out an acceptable stacking of delimbed trunks. Such an operation was very difficult to carry on with prior art processing heads including driving means.

More particularly, the invention relates to an improvement in a felling and delimbing apparatus of the type comprising:
a head for felling and delimbing trees and including:
a frame,
at least two grasping jaws pivotally mounted on said frame and movable toward or away from each other,
means for selectively moving and positioning said grasping jaws toward or away from each other,
delimbing knives mounted on said frame and/or on said grasping jaws, and
first and second means for cutting the trunk of a tree, the first means being positioned above the grasping means while the second means are positioned under the grasping means;
a platform which is pivotally mounted on a frame of the vehicule and associated with means for moving it around a substantially vertical pivoting axis;

a first and second booms pivotally connected together by a first pivoting means defining a substantially horizontal pivoting axis, the first boom being also pivotally connected with the platform by a second pivoting means defining a substantially horizontal pivoting axis, the second boom being also pivotally connected with a first supporting member by a third pivoting means defining a substantially horizontal pivoting axis, the frame of the head and the first supporting member being connected together; and driving means intended to engage the trunk of a tree having a longitudinal axis and drive it according to a driving axis, when said driving axis is substantially coaxial with an axis intended to be substantially coaxial with the longitudinal axis of the trunk and substantially parallel with a longitudinal axis of the head and passing between grasping jaws, in order to allow branches of the tree to be pressed against delimbing knives and thus delimb the tree. Said improvement is characterized by the fact that the frame of the head and the first supporting member are pivotally connected together by a fourth pivoting means defining a pivoting axis that is substantially not parallel with aforesaid horizontal axis, that means are provided to selectively move and position the head around the fourth pivoting axis, that said driving axis is substantially horizontal and that said driving means are mounted in such a way on the platform that movements of said booms, supporting member and head around their respective pivoting axis will allow to set the longitudinal axis of a trunk substantially coaxial with the driving axis and engage the driving means against this trunk.

The invention also relates to a method for felling and delimbing a tree with an apparatus of the type defined hereinbefore, said method comprising the following steps:

positioning grasping jaws around and close the trunk of a tree, at the foot thereof, by selective movements and positioning of booms, of the first supporting member and of the head around their respective pivoting axis, and then sliding the head upwardly along a determined length of the trunk by selective movement and positioning of booms, of the first supporting member and of the head around their respective pivoting axis, to thus press branches of the tree against delimbing knives and delimbed a determined length of said tree;

sliding down the head at the foot of the tree by selective movements and positioning of booms, of the first supporting member and of the head around their respective pivoting axis, moving grasping means against the trunk and separating the trunk for the stub with second means for cutting said trunk;

moving grasping jaws slightly away from each other and by selective movements and positioning of booms, of the first supporting member and of the head around their respective pivoting axis, sliding the head upwardly along the trunk at a determined distance, and then moving grasping jaws again against the trunk, and by selective movements and positioning of booms, of the first supporting member and of the head around their respective pivoting axis, lifting the tree above the ground;

selectively moving and positioning the booms, the first supporting member and the head around their respective pivoting axis to bring the longitudinal axis of the trunk substantially co-axial with the driving axis, and to engage the foot of the trunk with driving means;

moving grasping jaws slightly away from each other and starting driving means so as to pull the trunk between grasping jaws and press branches against delimbing knives to thus delimb another determined length of the tree, and then stopping driving means;

separating the trunk from the top of the tree with first means for cutting the trunk of the tree;

starting driving means in reverse direction to push the delimbed trunk between grasping jaws until the trunk is out of engagement by said driving means;

moving grasping means again against the trunk and by selective movement and positioning of the booms, the supporting member, the head and the platform around their respective pivoting axis, and positioning the trunk above a stack of trunks; and moving grasping means away from each other to release the trunk on the stack of trunks.

BRIEF DESCRIPTION OF THE DRAWINGS

The present invention will be better understood with the following description of preferred embodiments thereof, making reference to the following drawings:

FIG. 1 is a top plan view of the improved felling and delimbing apparatus according to the invention;

FIG. 1a is an enlarged view of a part of FIG. 1;

FIG. 1b is an enlarged view according to Ib—Ib in FIG. 1 of a part of the table whose a portion of the top surface has been removed to show a hinge and a stopper;

FIG. 1c is a cross-sectional view of the table shown in FIG. 1b according to Ic—Ic;

FIG. 1d is a cross-sectional view according to Id—Id shown in FIG. 2, partly in horizontal position (see dotted lines) and in vertical position (see full lines);

FIG. 2 is a side elevational view of the improved felling and delimbing apparatus according to the invention;

FIG. 6 is a top plan view, according to VI—VI in FIG. 5, of a driving wheel;

FIG. 7 is a cross-sectional view, according to VII—VII in FIG. 6, of the driving wheel;

FIG. 9 is a rear elevational view of the felling and delimbing head of the apparatus according to the invention;

FIG. 10 is an exploded view of pivoting means between the first supporting member and the felling and delimbing head;

FIG. 11 is a cross-sectional view, according to XI—XI in FIG. 8, of the felling and delimbing head;

FIG. 12 is a top plan view, according to XII—XII in FIG. 8, of means for cutting the top of a tree;

FIG. 13 is a side elevational view, according to XIII—XIII in FIG. 12, of means for cutting the top of a tree;

FIG. 14 is a top plan view similar to the one of FIG. 12 but with jaws in opened position;

FIG. 15 to 22 represent steps for carring out a method using an apparatus as defined in FIGS. 1 to 14.

Figure 3:
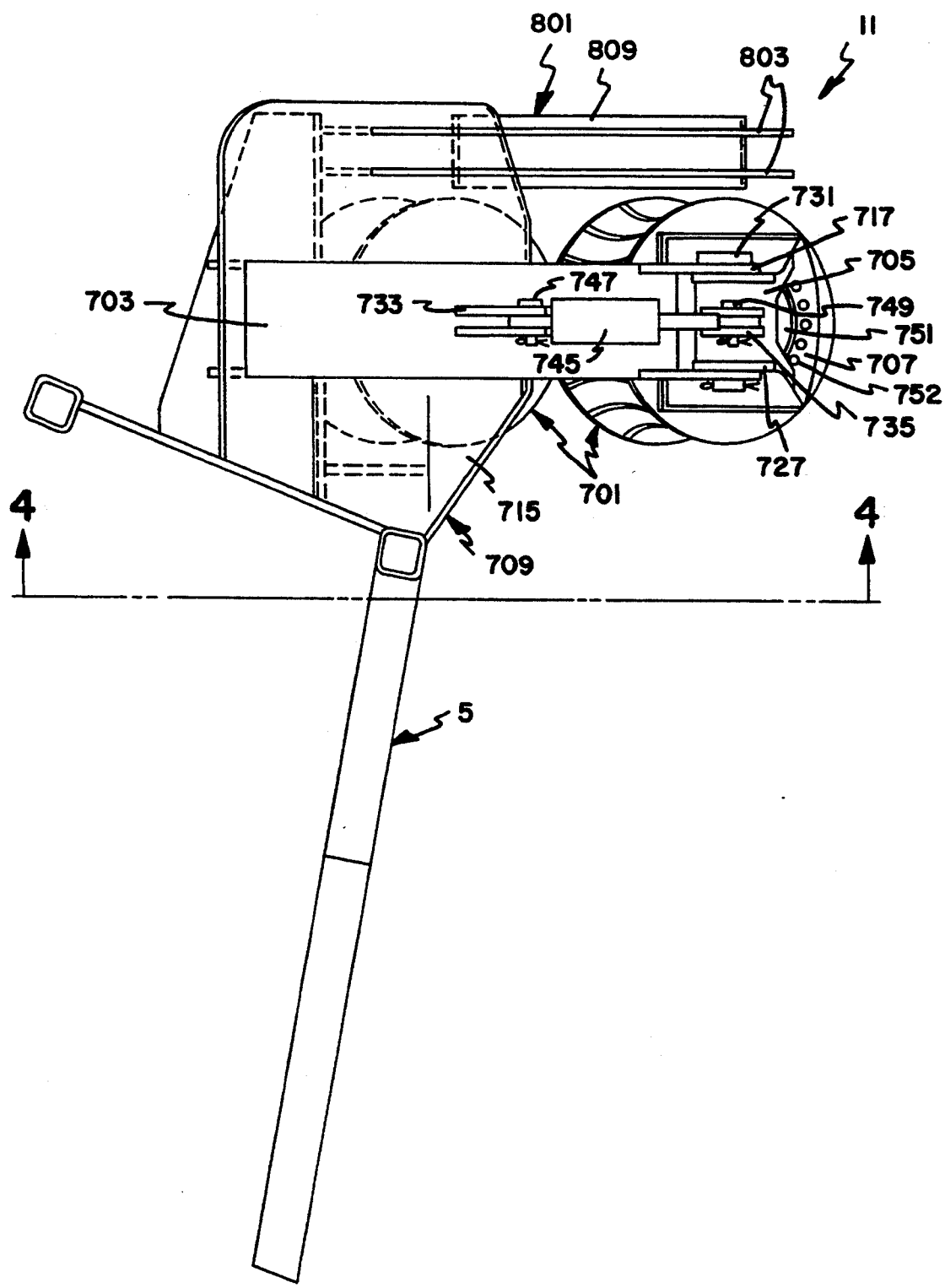
FIG. 3 is an enlarged top plan view, according to III—III in FIG. 1, of driving means in closed position mounted on the platform (with hidden parts of the second supporting member, of the hidden roller and of the hidden part of the guide shown in dotted lines)

The invention relates to an improvement in a felling and delimbing apparatus 1 of the type comprising a head 3 for felling and delimbing trees, a platform 5, a first and second booms 7 and 9, and driving means 11.

The platform 5 is pivotally mounted on a frame 51 of a vehicle and associated with means for conventionally moving it around a substantially vertical pivoting axis. Preferably, in FIGS. 1 and 2, there is represented a conventional self-propelled vehicle provided with a pair of caterpillar tracks 55 and with the platform 5 mounted on the frame 51 so as to be pivotable, on a conventional bearing, around a substantially vertical pivoting axis. The vehicle may be further provided, for example, with power means, especially a diesel engine in fluid communication with a fuel tank containing fuel, a hydraulic pump in fluid communication with a hydraulic reservoir containing hydraulic fluids, means for coupling the power means with caterpillar tracks, means for coupling the power means with the hydraulic pump, means for controlling the power means, means for controlling the caterpillar tracks, means for pivotally driving the platform 5 around the substantially vertical axis, means for coupling the power means with means for pivotally driving the platform 5, and tubings interrupted by appropriate valves in order to allow hydraulic jacks, especially double action type jacks, to be selectively put in fluid communication with the hydraulic pump. All aforesaid characteristics are standard and well known in the art and do not need an additional description.

With reference to FIGS. 2 and 10, the first boom 7 and the second boom 9 are pivotally connected together by a first pivoting means 71 defining a substantially horizontal pivoting axis. The first boom 7 is also pivotally connected with the platform 5 by a second pivoting means 73 defining a substantially horizontal pivoting axis. The second boom 9 is also pivotally connected with a first supporting member 75 by a third pivoting means 77 defining a substantially horizontal pivoting axis. The frame 30 of the head 3 and the first supporting member 75 are pivotally connected together by a fourth pivoting means 79 (see FIG. 10) defining a pivoting axis that is substantially not parallel with aforesaid horizontal pivoting axis.

Means are provided and adapted to selectively move and position the booms 7 and 9, the first supporting member 75 and the head 3 around their respective pivoting axis defined by first to fourth pivoting means 71, 73, 77 and 79.

More particularly, the boom 7 has opposite ends, one of said ends being provided with a fork 81 while the opposite end is provided with a fork 83. Preferably, the fork 81 consist of two plates each provided with a bore and integral with the boom 7, and the fork 83 consists of two plates each provided with a bore and integral with the boom 7. More preferably, plates of forks 81 and 83 are made of steel and are welded on the boom 7 which is also made of steel.

The fork 81 is fitted over a support 93 integral with the platform 5. Preferably, the support 93 consists of two plates (advantageously steel plates) each integral, especially welded, with the platform 5 (which is advantageously made of steel) and provided with a bore. The fork 81 and the support 93 are positioned in such a way with respect to each other that bores of their plates register together, and a pin 99 is engaged through said bores. The pin 99, which is preferably made of steel, may be of the type provided with a head and a transversal bore opposite the head and intended to receive a cotter pin (preferably made of steel).

With reference to FIG. 2, the underneath of boom 7 is further provided with a fork 107 and the platform 5 is further provided with a support 109. The fork 107 preferably consists of two plates (advantageously steel plates) each integral, especially welded, with the boom 7 and each provided with a pair of bores. The support 109 preferably consists of two plates (advantageously steel plates) provided with a bore and integral, especially welded, with the platform 5. As means adapted to selectively move and position the boom 7 around the pivoting axis defined by the second pivoting means 73, a hydraulic jack 119 is provided. This jack 119 connects the fork 107 and the support 109. More particularly, the jack 119 has opposite ends each provided with a connecting sleeve registering with corresponding bores of the fork 107 and support 109 and pins 121 and 123 are engaged through corresponding bores and connecting sleeves. Pins 121 and 123 which are preferably made of steel, may be of the type provided with a head and a transversal bore, opposite the head, intended to receive a cotter pin (preferably made of steel). The hydraulic jack 119 is of double-action type and of course comprises usual tubings including a hydraulic pump and a valve, for connecting it with a hydraulic fluid contained in a reservoir so as said jack, by an appropriate positioning of the valve, moves the boom 7 around the pivoting axis defined by the second pivoting means 73. It should be noted that because the hydraulic pump, tubings and valve connecting the jack 119 to said hydraulic fluid contained in a reservoir were characteristics well known to a man skilled in the art, they were not illustrated in FIG. 2 for clarification purposes.

More particularly, the boom 9 has opposite ends, one of said ends being provided with a fork 125 while the opposite end is provided with a fork 126 (see FIG. 1a). Preferably, the fork 125 consist of two plates (advantageously steel plates) each provided with a bore and integral, especially welded, with the boom 9. Preferably, the fork 126 consists of two plates (advantageously steel plates) each provided with a bore and integral, especially welded, with the boom 9.

The fork 83 is fitted with the fork 125 in such a way to each other, that their bores register together and a pin 149 is engaged through said bores. The pin 149, which is preferably made of steel, may be of the type provided with a head and a transversal bore opposite the head and intended to receive a cotter pin (preferably made of steel).

The underneath of boom 9 is further provided with a fork 135 (see FIG. 2) which preferably consists of two plates (advantageously steel plates) each provided with a bore and integral, especially welded, with the boom 9.

As means adapted to selectively move and position booms 7 and 9 around the pivoting axis defined by the first pivoting means 71, a hydraulic jack 143 is provided. This jack 143 connects the fork 107 and the fork 135. More particularly, the jack 143 has opposite ends each provided with a connecting sleeve registering with corresponding bores of the forks 107 and 135, and pins 145 and 147 are respectively engaged through corresponding bores and connecting sleeves. Pins 145 and 147 which are preferably made of steel, may be of the type provided with a head and a transversal bore, opposite the head and intended to receive a cotter pin (preferably made of steel). The hydraulic jack 143 is of double action type and of course comprises usual tubings including a hydraulic pump and valve, for connecting it with a hydraulic fluid contained in a reservoir so as said jack, by an appropriate positioning of the valve, moves the boom 9 around the pivoting axis defined by the first pivoting means 71. It should be noted that because the hydraulic pump, tubings and valve connecting the jack 143 to said hydraulic fluid contained in a reservoir were characteristics well known to a man skilled in the art, they were not illustrated in FIG. 2 for clarification purposes.

The first supporting member 75 preferably consists of a plate 157 (advantageously a steel plate) having opposite faces, and plates (advantageously steel plates) 159 and 161 which are integral, especially welded, on one face of said plate 157 by one of their edge so as to be substantially at an angle (preferably about 40°) with respect to said plate 157, each plates 159 and 161 being each further provided with two bores 163 and 165. The opposite face of the plate 157 is intended to receive a disk 167 provided with a flange defining a groove 168. The disk 167 is fastened to the plate 157 by any appropriate means such as bolts 167a (only one shown) which is threaded, engaged in corresponding holes 167b and screwed in corresponding threaded holes 167c.

Plates 159 and 161 are fitted with the fork 126 in such a way to each other that bores 163 register with bores of the fork 126, and a pin 169 is engaged through said bores. The pin 169, which is preferably made of steel, may be of the type provided with a head and a transversal bore opposite the head and intended to receive a cotter pin (preferably made of steel). Preferably, each bore 163 is defined by a bushing 164 mounted across and integral with a corresponding bore provided in the plate 159 or 161.

The boom 9 is further provided with a pair of levers 177 having a length, each provided with bores and pivotally mounted on each side of said boom 9 which is provided with intermediate bore having an axis substantially parallel with the axis defined by the pin 169. A pin 183 passes through the intermediate bore of the boom 9 and a corresponding bore of each levers 177. The pin 183 which is preferably made of steel may be of the type provided with a head and a transversal bore opposite the head and intended to receive a cotter pin (preferably made of steel).

An arm 191 (advantageously made of steel) having opposite ends is provided with a fork 193 at one end thereof and a fork 195 at the opposite end. Preferably, the fork 193 consists of two plates (advantageously made of steel) each provided with a bore and integral, especially welded, with the arm 191, and the fork 195 consists of two plates (advantageously made of steel) each provided with a bore and integral, especially welded, with the arm 191.

Plates 159 and 161 are fitted with the fork 193 in such a way to each other that bores 165 register with bores of the fork 193, and a pin 205 is engaged through said bores. The pin 205, which is preferably made of steel, may be of the type provided with a head and a transversal bore opposite the head and intended to receive a cotter pin (preferably made of steel). Preferably, each bore 165 is defined by a bushing 166 mounted across and integral with a corresponding bore provided in the plate 159 or 161.

A fork 213 is further provided on the top of the boom 9. This fork 213 preferably consists of two plates (advantageously steel plates) each provided with a bore and integral, especially welded, with the boom 9. Advantageously, the plates of the fork 213 are further integral, especially welded, with a member 216 (advantageously made of steel) welded on the top of the boom 9.

As means adapted to selectively move and position the boom 9 and the first supporting member 75 around the pivoting axis defined by the third pivoting means 77, a hydraulic jack 221 is provided. This jack 221 connects the fork 213 with the fork 195 and levers 177. More particularly, the jack 221 has opposite ends each provided with a connecting sleeve 222 registering respectively with corresponding bores of the fork 213, and fork 195 and levers 177, and pins 223 and 225 are engaged through said bores and corresponding sleeves of the jack 221. Pins 223 and 225 which are preferably made of steel, may be of the type provided with a head and a transversal bore opposite the head and intended to receive a cotter pin (preferably made of steel). The hydraulic jack 221 is of double action type and of course comprises usual tubings including a hydraulic pump and a valve, for connecting it with a hydraulic fluid contained in a reservoir so as said jack, by an appropriate positioning of the valve, moves the arm 191 and levers 177 around pivoting axis defined by pins 183, 205 and 225, and move the first supporting members 75 around a pivoting axis defined by the third pivoting means 77. It should be noted that because the hydraulic pump, tubings and valve connecting the jack 221 to said hydraulic fluid contained in a reservoir were characteristics well known to a man skilled in the art, they were not illustrated in FIGS. 1 and 2 for clarification purposes.

The head 3 includes a frame 30, at least two grasping jaws 32 pivotally mounted on the frame 30 and movable toward or away from each other, means for selectively moving said grasping jaws 32 toward or away from each other, delimbing knives mounted on said frame 30 and/or said jaws 32, first means for cutting the top of a tree from the trunk, and second means for cutting the trunk of a tree.

Preferably, the frame 30 consists of a plate 301 having opposite faces, plates 303 and 305 which are integral, especially welded, on one face of said plate 301 by one of their edge so as to be substantially at an angle (preferably about 40°) with respect to said plate 301, and plate 307 joining edges of plates 303 and 305 together and being at an angle with respect to 303 and 305. The opposite face of the plate 301 is intended to received a collar 309 provided with a flange defining a groove 311. The collar 309 is fastened by any appropriate means to the plate 301, such as bolts 309a (only one shown) engaged in corresponding holes 309b and screwed in corresponding threaded holes 309c. Plates 301, 303, 305, 307, disk 167 and collar 309 are advantageously made of steel.

The plate 301 of the frame 30 is pivotally mounted on the supporting member 75 when a radial face of groove 168 of the disk 167 is engaged against a corresponding radial face of the groove 311 of the collar 309, as illustrated in FIG. 10. Of course, a lubricant, such as grease, may be provided between the collar 309 and the disk 167. This assembly defines a preferred embodiment of the fourth pivoting means 79.

Plates 157 and 301 are respectively provided with forks 369 and 371. The fork 369 consists of two plates (advantageously made of steel) each provided with a bore and integral, especially welded, with the plate 157. The fork 371 consists of two plates (advantageously made of steel), each provided with a bore and integral, especially welded with the plate 301. Preferably, each bore of forks 369 and 371 may be defined by a sleeve defining bushings 370 and 372 mounted across and integral (especially welded) with a corresponding bore provided in the plates of said forks 369 and 371.

Figure 8:
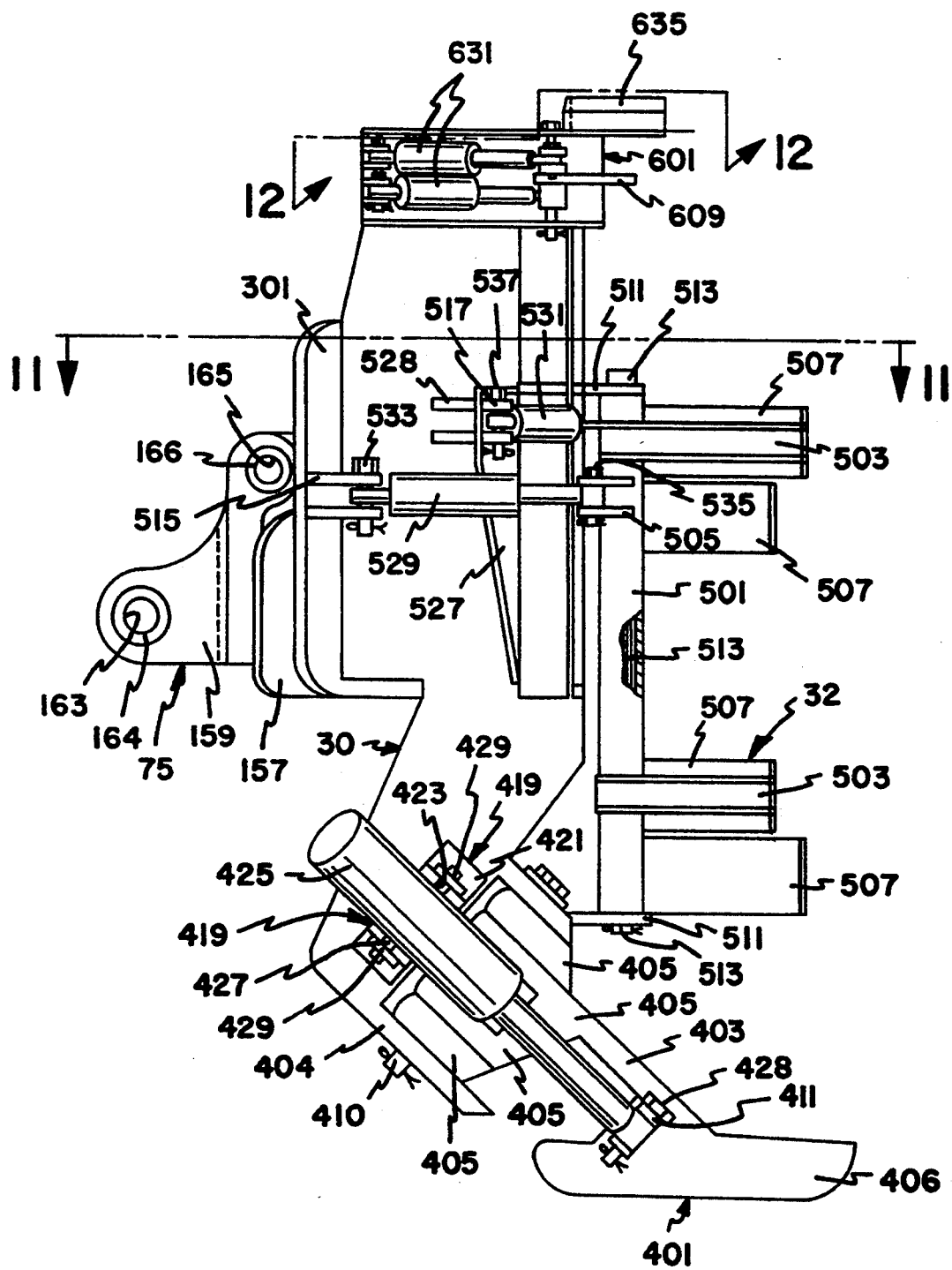
FIG. 8 is a side elevational view of the felling and delimbing head of the apparatus according to the invention.

With reference to FIGS. 8, 9 and 11, as means adapted to selectively move and position the head 3 with respect to the first supporting member 75, around the pivoting axis defined by the fourth pivoting means 79, a hydraulic jack 381 is provided. This jack 381 connects forks 369 and 371. More particularly, the jack 381 has opposite ends, each provided with a connecting sleeve registering with corresponding bores of forks 369 and 371 and pins 383 and 385 are engaged through corresponding bores and corresponding connecting sleeves of the jack 381. Pins 383 and 385 which are preferably made of steel, may be of the type provided with a head and a transversal bore opposite the head and intended to receive a cotter pin (preferably made of steel). The hydraulic jack 381 is of double action type and of course comprises usual tubings including a hydraulic pump and a valve, for connecting it with a hydraulic fluid reservoir so as said jack 381, by an appropriate positioning of the valve, moves plates 157 and 301 around a pivoting axis defined by engagement of the disk 167 with collar 309. It should be noted that because the hydraulic pump, tubings and valve connecting the jack 381 to said hydraulic fluid contained in a reservoir were characteristics well known to a man skilled in the art, they were not illustrated in figures for clarification purposes.

Of course, forks 369 and 371 are spaced apart at such a distance from each other that a stroke of a cylinder 382 of the hydraulic jack 381 will allow to pivot the plate 301 in such a way around the fourth pivoting axis 79 that the longitudinal axis of the head 3 will be set substantially parallel with the driving axis defined by driving means 11. Preferably, forks 369 and 371 do not project to far from plates 157 and 301 so as to maximize the rotation of plate 301 around the fourth pivoting axis 79 for a given stroke of the cylinder 382 of the hydraulic jack 381. More preferably, the hydraulic jack may have a longitudinal axis that is substantially parallel with the longitudinal axis of the head 3 (as illustrated in FIG. 9) or, optionally, slightly diverging upwardly (as illustrated in FIG. 11).

As second means for cutting the trunk of a tree, advantageously a pair of opposite jaws 401 are pivotally mounted on a fork 404 provided at the bottom of the frame 30 by any appropriate means known in the art (e.g. see Canadian Pat. No. 1,046,909 and U.S. Pat. No. 4,131,145). Preferably, each jaw 401 consists of an arm 403, having opposite ends, one end thereof defining a part 406 provided with a knife 407, while the opposite end is provided with a fork 405 comprising at least two parallel members, each provided with a bore. Said parallel member of the fork 405 of one arm 403 are spaced apart in such a way that parallel members of the fork 405 of the other arm 403 may be positioned there between in order to allow bores of each parallel members of forks 405 to register together while keeping knives facing to each other and to register with bores of the fork 404 in order to pivotally connect forks 405 and 404 with a pin 410 engaging corresponding bores.

Each arm 403 is further provided with a small fork 411 consisting of two plates provided with a bore and the frame 30 is further provided a fork 419 consisting of two plates 421 each provided with a slot 423. More preferably, each plate 421 is fastened at one end thereof by any appropriate means such as welding, to a plate 422 itself bolted or welded to the frame 30.

As means adapted to selectively move the knives 406 one against the other or away from each other, around a pivoting axis defined by the longitudinal axis of pin 410, hydraulic jacks 425 connects forks 411 and 419 together. Preferably, each hydraulic jack 425 comprises a jacket provided with pins 427 intended to engage the slot 423 and a corresponding cap 429 fastened to the fork 419, and a cylinder whose the free end is provided with a connecting sleeve that register with bores of the fork 411, a pin 428 passing through said bores of the fork 411 and a connecting sleeve. Pins 427 and 428 are conventionally made of steel, and pin 428 is provided with a head, a transversal bore opposite the head and intended to receive a cotter pin (preferably made of steel). Each hydraulic jack 425 is of double action type and of course comprises usual tubings including a hydraulic pump and a valve, for connecting it with a hydraulic fluid reservoir so as said jacks, by an appropriate positioning of the valve, move arms 403 around the pin 410 and knives 407 away from each other or one against the other. It should be noted that because the hydraulic pump, tubings and valve connecting jacks 425 to said hydraulic fluid contained in a reservoir were characteristics well known to a man skilled in the art, they were not illustrated in figures for clarification purposes. It should also be noted that said second means are well known in the art and do not need a further extensive description.

Each grasping jaw 32 preferably consists of an elongated sleeve 501 on which are fastened, especially by welding, two arcuated jaws 503 and a small fork 505 or a small fork 506 each comprising two plates each provided with a bore. Inside each jaw 503 is fastened by any appropriate means, such as bolting or welding, a knife 507. The frame 30 is provided with brackets 511 each provided with two corresponding bores. Each sleeve 501 registers with two corresponding bores 511 and a pin 513 engages said bores and sleeve 501. Each pin 513 is conventionally made of steel, provided with a head, a transversal bore, opposite the head, and intended to receive a cotter pin (preferably made of steel).

The frame 30, especially the plate 303, is further provided with forks 515 and 517. The fork 515 consists of two plates each provided with a bore and integral, especially welded, on the plate 303. The fork 517 consist of two plates each provided with a bore and integral, especially welded, on a plate 527 itself integral, especially welded, on the plate 303. Spacers 528 may be provided between plates 303 and 527.

As means adapted to selectively move and position grasping jaws toward or away from each other, around pivoting axis defined by pins 513, a hydraulic jack 529 connects fork 515 with a corresponding fork 505, and a hydraulic jack 531 connects fork 517 with the fork 506. Preferably, the hydraulic jack 529 has opposite ends provided with a connecting sleeve and a connecting plate provided with a bore registering respectively with corresponding bores of forks 505 and 515 and pins 533 and 535 are respectively engaged through corresponding bores of forks 505 and 515 and connecting sleeves of the jack 529. Preferably, the hydraulic jack 531 has opposite ends provided with a connecting sleeve and a connecting plate provided with a bore registering respectively with corresponding bores of forks 506 and 517 and pins 537 and 539 are respectively engaged through corresponding bores of the fork 506 and 517 and connecting sleeves of the jack 531.

Pins 533, 535, 537 and 539 are conventionally made of steel, provided with a head and a transversal bore opposite the head and intended to receive a cotter pin (preferably made of steel). Each hydraulic jack 529 and 531 is of double action type and of course comprises usual tubings including a hydraulic pumps and a valve, for connecting it with a hydraulic fluid reservoir so as said jacks 529 and 531 by an appropriate positioning of the valve, selectively move and position arcuated jaws 503 around a corresponding pin 513 toward or away from each other. It should be noted that because the hydraulic pump, tubings and valve connecting jacks 529 and 531 to said hydraulic fluid contained in a reservoir were characteristics well known to a man skilled in the art, they were not illustrated in FIGS. 8 to 11 for clarification purposes.

As first means for cutting the top of a tree from the trunk, the top of the frame 30 is provided with a frame 601 consisting of an assembly of plates defining a box 603 provided with an opening 605. Within that box 603 are mounted a pair of arms 607 each provided with a knife 609. Advantageously, each knife 609 is fastened to the arm 607 by any appropriate means, such as welding of said knife on a corresponding arm 607. Each arm 607 has opposite ends, one end being provided with a bore that register with corresponding bores provided in the top and bottom plates of box 603, a pin 615 being engaged through said bores to make the arm 607 pivotally mounted inside the box 603. The opposite end of each arm 607 is provided with a fork 617 consisting of two plates each provided with a bore and integral, especially welded, with said arm 607. Forks 621 are provided inside the box 603. Each fork 621 consist of two plates each provided with a bore and integral with an inner wall of the box 603. Pins 615 are conventially made of steel, provided with a head and a transversal bore, opposite the head, and intended to receive a cotter pin (preferably made of steel), are respectively engaged through corresponding bores of corresponding forks of arm and plates. Two hydraulic jacks 631 connect one fork 621 with one fork 617. Preferably, each said hydraulic jacks 631 has opposite ends provided with connecting plates provided with a bore registering respectively with bores of forks 617 and 621, and engaged by pins 629 and 633 respectively. Pins 629 and 633 are conventionally made of steel, provided with a head and a transversal bore opposite the head and intended to receive a cotter pin (preferably made of steel). Each hydraulic jack 631 is of double action type and of course comprises usual tubings including a hydraulic pump and a valve, for connecting it with a hydraulic fluid reservoir so as by an appropriate positioning of the valve, jacks 631 and move knives 609 toward or away from each other. It should be noted that because the hydraulic pump, tubings and valve connecting jacks 631 to said hydraulic fluid contained in a reservoir were characteristics well known to a man skilled in the art, they were not illustrated in FIGS. 12 to 14 for clarification purposes.

The top of the frame 601 may be further provided with a delimbing knife 635. This knife may be mounted on the frame 601 by any appropriate means such as bolting or riveting. Preferably, the front edge of the top of the box 603 is shaped to be hemicircular above the opening 605 and the knife 635 is bolted or welded on the periphery of this hemicircular front edge.

The apparatus 1 comprises driving means 11 for the trunk of a tree, said trunk having a longitudinal axis and being intended to be engaged by said driving means 11 according to an axis that is substantially parallel with a longitudinal axis of the head 3 and pass between grasping jaws 32 in order to allow branches of the tree to be pressed against delimbing knives 507 and 635.

More particularly, the driving axis is substantially horizontal and driving means 11 are mounted in such a way on the platform 5 that movements of booms 7,9, of the supporting member 75 and of the head 3 around their pivoting axis will allow to set the longitudinal axis of the trunk substantially co-axial with the driving axis.

Advantageously, said driving means 11 comprise at least two rollers, especially two rollers 701, distributed around the driving axis, at least one of said rollers 701 being coupled with means adapted to drive it into rotation, and at least one of said rollers 701 being movable substantially perpendicularly with respect to the driving axis between two positions, the first being defined when at least one of said rollers is free of any engagement with the trunk of the tree, the second position being defined when all the rollers are pressed against the trunk of the tree.

With reference to FIGS. 2 to 7, according to a particularly preferred embodiment of the invention, driving means 11 may comprises:

a third and fourth booms 703 and 705 privotally connected together by a fifth pivoting means defining a pivoting axis substantially horizontal, the third boom 703 being fixed to the platform 5, the fourth boom 705 being provided with a third supporting member 707, two rollers 701 distributed around and on substantially opposite sides of the driving axis 700, one of said rollers 701 being pivotally mounted on a second supporting member 709 itself mounted to the platform 5, and coupled with means adapted to selectively drive it into clockwise or anticlockwise rotation, the other of said rollers 701 being pivotally mounted on the third supporting member 707 and coupled with means adapted to selectively drive it into clockwise or anticlockwise rotation, being understood that when one roller is rotated in a clockwise rotation, the other is rotated in a anti-clockwise rotation and vice-versa, means adapted to selectively move and position the fourth booms 705 around the fifth pivoting means so as to selectively press the rollers 701 against the trunk of the tree 711, in order to drive it forward or backward, or at least make the roller 701 mounted on the third supporting member 707 free of any contact with the trunk of the tree 711.

More particularly, the boom 703 has opposite ends, one end being integral, especially welded, with said second supporting member 709 which comprises a plate 715 substantially inclined with respect to the horizontal and parallel with the driving axis 700, the opposite end being provided with a fork 717 consisting of two plates integral with the boom 703 and each provided with a bore. The supporting member 709 is fastened by any appropriate means to the platform 5. Preferably, as illustrated in FIG. 1, the platform 5 may be truncated so as to position the supporting assembly closer to the boom 7.

The boom 705 has opposite ends, one end being integral with a supporting member 707 consisting of a plate provided with an aperture 725, the opposite end being provided with a fork 727 consisting of two plates, integral with the boom 705 and each provided with bores.

The fork 717 is fitted over the fork 727 in such a way to each other that their bores register together and a pin 731 is engaged them. The pin is 731 conventionally made of steel, has a head and a transversal bore, opposite the head, intended to receive a cotter pin (preferably made of steel).

Booms 703 and 705 are further provided small forks 733 and 735, respectively. Fork 733 consists of two plates integral, especially welded, with the boom 703 and each provided with a bore. Fork 735 consists of two plates integral, especially welded, with the boom 705 and each provided with a bore.

As means adapted to selectively move and position the fourth boom 705 around the fifth pivoting means (i.e. around pin 731), a hydraulic jack 745 connects forks 733 and 735 together. Preferably, said hydraulic jack 745 has opposite ends provided with connecting plates provided with a bore registering respectively with bores of corresponding forks 733 and 735, and pins 747 and 749 are engaged through said corresponding bores of forks 733 and 735 and corresponding connecting sleeves of the jack 745. Pins 747 and 749 are conventionally made of steel, provided with a head, a transversal bore opposite the head and intended to receive a cotter pin (preferably made of steel). The hydraulic jack 745 is of double action type and of course comprises usual tubings including a hydraulic pump and a valve, for connecting it with a hydraulic fluid reservoir so as by an appropriate positioning of the valve, jack 745 moves the boom 705 around the fifth pivoting means (defined by the pin 731) from a first position (see FIG. 5) to a second (see FIG. 4) and vice versa. It should be noted that because the hydraulic pump, tubings and valve connecting jack 745 to said hydraulic fluid contained in a reservoir were characteristics well known to a man skilled in the art, they were not illustrated in figures for clarification purposes.

Preferably, each roller 701 is mounted on the rotor of a hydraulic motor 751 comprising a stator and a rotor. The stator is fastened, by any appropriate means such as for example bolt 752 engaging threaded holes (provided in plates of supporting members 715 or 707), across a corresponding aperture 716 (shown in dotted lines) or 725 (shown in full lines) of said corresponding plates of supporting members 709 and 707. Of course, each hydraulic motor is designed to selectively rotate in a clockwise or anti-clockwise direction and comprises the usual tubings including a hydraulic pump and a valve for connecting it with a hydraulic fluid reservoir so as by an appropriate positioning of the valve, the hydraulic motor drives the roller 701 in a clockwise or anti-clockwise rotation. Advantageously, each hydraulic motor may be of the type of the one sold under the trade name MS 08 by Poclain Hydraulic. Such a hydraulic motor as well as hydraulic pump, tubings and valve used are well known in the art and do not need an extensive description.

Preferably, each roller 701 (see FIGS. 6 an 7) consists of a cylinder 753 provided with an inner disk 755 on which the shaft of the rotor is bolted (see bolts 758), and provided with a plurality of radial members 759. The cylinder 753, the disk 755 and radial members 759 are preferably made of metal (especially steel) and welded together by any appropriate means known in the art.

Advantageously, according to a preferred embodiment of the invention, ahead the driving means 11 is provide a guide 801 comprising a member 803 having opposite ends, one end thereof being mounted on to platform 5 while the opposite end is defining a reverse "U", said "U" defining a plane substantially perpendicular with the driving axis. The driving axis 700 intersects a plane located between branches of the "U".

More particularly, the guide 801 may consist of two parallel members 803, whose one end thereof is fastened by any appropriate means, especially welded, on the plate 715 while the inner periphery of the reversed "U" is integral with a strip 809. The guide which is generally made of metal, is intended to facilitate the positioning of the foot of a tree between rollers 701.

According to a particularly preferred embodiment of the invention,
the first and second booms 7,9 are substantially contained and movable according to a longitudinal and substantially vertical plane,
rollers 701 are positioned on the same side of this vertical plane and in such a way on the second and third supporting member 707,709 that the driving axis 700 converges toward and intersect the vertical plane at a point located within a span defined by said first and second booms 7 and 9.

Figure 4:
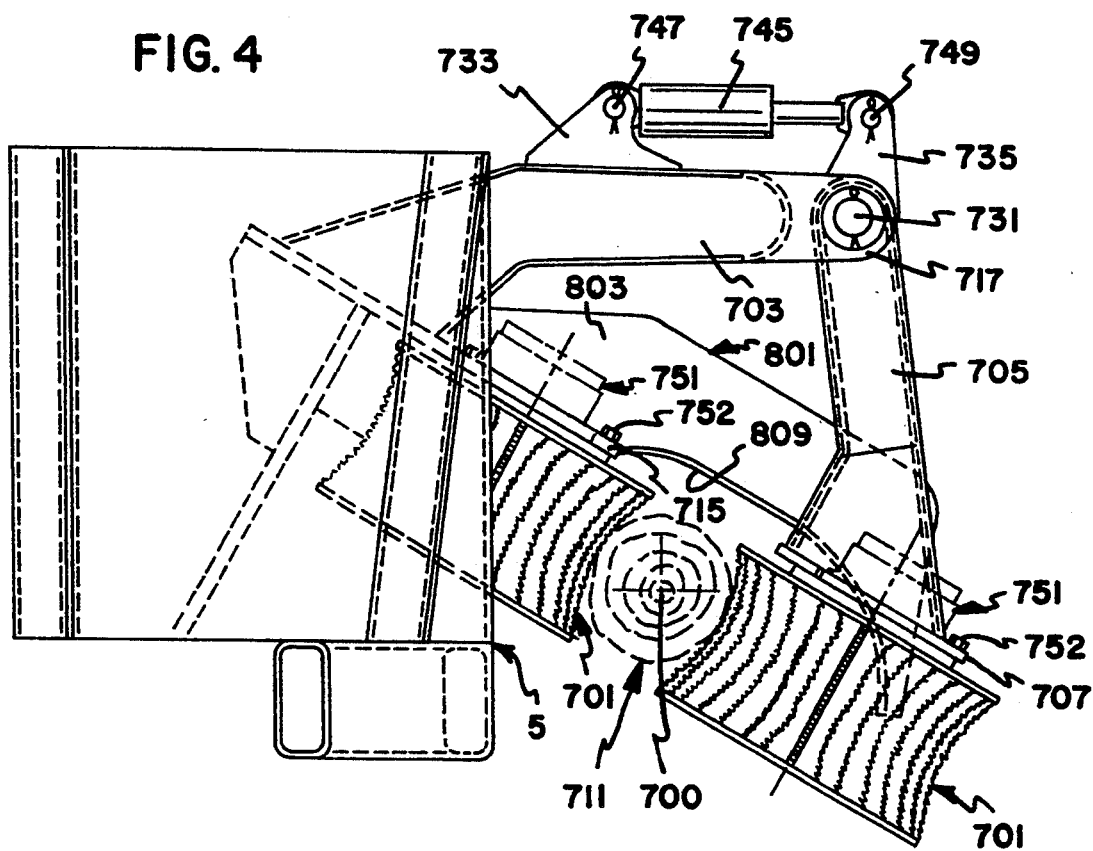
FIG. 4 is a side elevational view, according to IV—IV in FIG. 3, of driving means in closed position.
Figure 5:
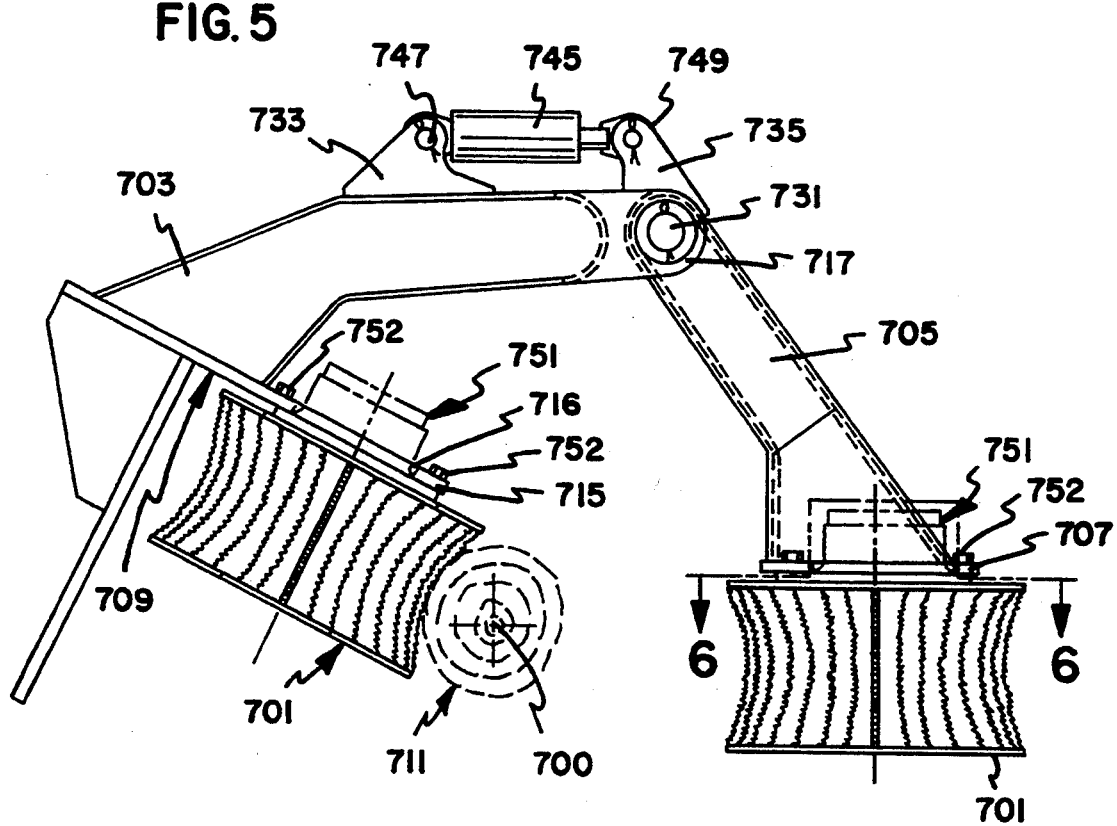
FIG. 5 is a side elevational view of driving means of FIG. 4, represented in opened position.

According to another particularly preferred embodiment of the invention, rollers 701 are further substantially positioned, when they are intended to be pressed against the trunk of a tree 711, in a plane that is inclined with respect to the horizontal (as illustrated in FIG. 4). Preferably, that plane is substantially parallel with the plate 715.

According to another particularly preferred embodiment of the invention, on one side of the platform 5 is positioned a substantially horizontal table 901 lying slightly underneath the driving axis 700 and behind the driving means 11. With reference to FIGS. 1b to 1d, this table 901 is fastened to the platform 5 by any appropriate means, especially with hinges 902 having members 903 and 903a respectively fastened, especially welded or bolted to the platform 5 and the table 901. Preferably, member 903 is welded to the frame part 5a of the platform 5 and member 903a is welded to the frame 906 of the table 901. Members 903 and 903a are pivotally connected with a pin 905 engaging corresponding bores provided in said members 903 and 903a. This pin 905, which is preferably made of steel, may be of the type provided with a head and a transversal bore opposite the head and intended to receive a cotter pin (preferably made of steel). The frame 906 of the table 901 may also be provided with at least one arm 604, especially two arms 604, intended to engage the underneath of the frame 5a of the platform 5 in order to keep the table 901 substantially horizontal. This table may contribute to support a segment of trunk 711 and thus further minimize the risk to have the trunk bowed and eventually have the foot of the trunk in contact with the ground. When the table 901 is not used, it may be tilted upwardly around pin 905. Means may be provided to keep table 901 in its raised position. Such means may consist, for at least one hinge 902, preferably each hinge 902, of a prohéminent part 903b (see FIG. 1c) when the table 901 is tilted upwardly to engage a corresponding aperture 907 (see FIG. 1) provided in a panel 906a (see FIG. 1d) defining the top surface of the table 901 so as said bore be located underneath the panel of the top surface, and then a pin 908 is engaged through said bore to lock the panel 901 into this upright position. To lower the table into a substantially horizontal position, one just have to remove pin(s) 908 and pivote the table around pins 905 until arms 904 be engaged against the frame 5a. According to another particularly preferred embodiment of the invention, the platform 5 may be further provided with means allowing to keep it into a substantially horizontal position. Those means are well known in the art and do not require any particular description thereof. (See Canadian Pat. No. 1,219,241).

Figure 18:
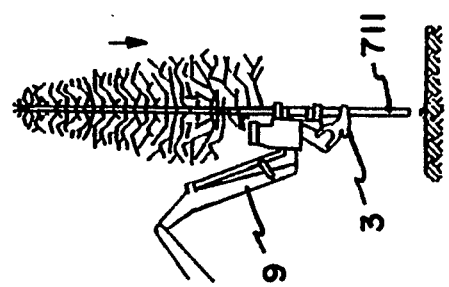
Figure 17:
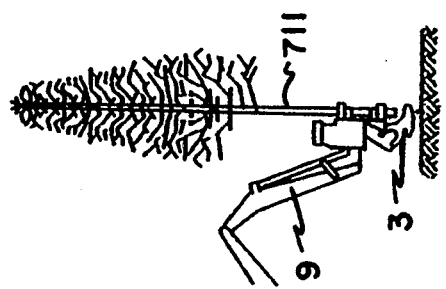
Figure 16:
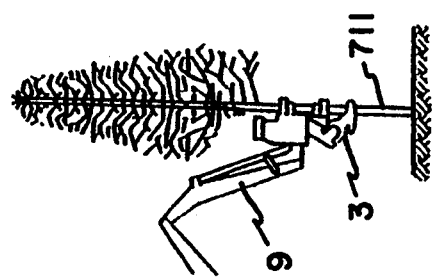
Figure 15:
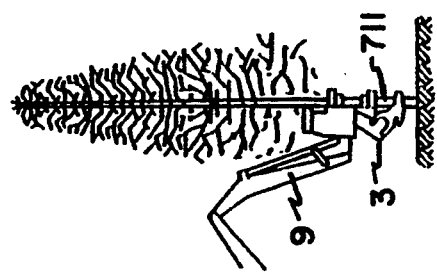

The invention also relates to a method of use of the above described apparatus 1. More particularly, said method comprises the following steps:

positioning grasping jaws 32 around and close the trunk 711 of a tree, at the foot thereof, by selective movements and positioning of booms 7,9, of the first supporting member 75 and of the head 3 (see FIG. 15), and then sliding the head 3 upwardly for a determined length of the trunk 711 by selective movement and positioning of booms 7,9 and of the first supporting member 75, to thus press branches of the tree against delimbing knives 507 and/or 635 and delimbed a determined length of said tree (see FIG. 16);

sliding down the head 3 at the foot of the tree by selective movements and positioning of booms 7,9 and of the supporting member 75, pressing grasping jaws 32 against the trunk 711 and separating the trunk from the stub with second means for cutting said trunk (see FIG. 17);

moving grasping jaws 32 slightly away from each other and sliding the head upwardly along the trunk 711 at a determined distance, pressing grasping jaws 32 again against the trunk 711, and lifting the tree above the ground (see FIG. 18);

moving and positioning the booms 7,9, the first supporting member 75 and the head 3 selectively around their respective pivoting axis to bring the longitudinal axis of the trunk 711 substantially co-axial with the driving axis 700, and to bring the foot of the trunk engaged by driving means 11 (see FIGS. 19 and 20);

moving grasping jaws 32 slightly away from each other and starting driving means 11 so as to pull the trunk 711 between grasppping jaws 32 and press branches against delimbing knives 507 and/or 635 to thus delimb another determined length of the tree, and then stopping driving means 11 (see FIG. 20);

separating the trunk 711 from the top of the tree with first means for cutting the trunk 711 of the tree (see FIG. 21);

starting driving means 11 in reverse direction to push the delimbed trunk between grasping jaws 32 until the trunk is out said driving means 11 (see FIG. 22);

pressing grasping means 32 again against the trunk 711 and by selective movement and positioning of the booms 7,9, the supporting member 75, the head 3 and the platform 5, and positioning the trunk 711 above a stack of trunks; and moving grasping means 32 away from each other to release the trunk 711 on the stack of trunks.

Advantageously, selective movements and positioning of booms 7,9 of the first supporting member 75 and of the head 3 for positioning grasping jaws 32 around and close the foot of the trunk 711 of a tree (see FIG. 15), is obtained when an operator sat in the cabin of the vehicule actuates for a certain time one or several valves, simultaneously or successively when more than one valve are actuated, in order to allow a hydraulic fluid pressurized by a hydraulic pump to be brought through appropriate tubings to corresponding hydraulic jacks 119, 143, 221 and/or 381 and thus increase or reduce the length of one or several of them.

Advantageously, selective movements and positioning of booms 7,9 and of the first supporting member 75 for sliding the head 3 upwardly for a determined length of the trunk 711, is obtained when the operator sat in the cabin of the vehicle actuates, for a certain time, one or several valves, simultaneously or successively when there is more than one valve that are actuated, in order to allow a hydraulic fluid pressurized by a hydraulic pump to be brought through appropriate tubing to corresponding hydraulic jacks 119, 143 and 221 and thus increase the length of jacks 119 and/or 143 and of jack 221 (see FIG. 16).

Advantageously, selective movements and positioning of booms 7,9 and of the supporting member 75 for sliding down the head 3 at the foot of the tree, is obtained when the operator sat in the cabin of the vehicule actuates, for a certain time, one or several valves, simultaneously or successively when there is more than one valve that are actuated, in order to allow a hydraulic fluid pressurized by a hydraulic pump to be brought through appropriate tubings to corresponding hydraulic jacks 119, 143 and 221 and thus reduce the length of jacks 119 and/or 143 and of jack 221.

Advantageously, grasping jaws 32 are pressed against the trunk 711 when the operator sat in the cabin of the vehicule actuates, for a certain time, one or several valves, successively or, preferably simultaneously, when more than one valve are actuated, in order to allow a hydraulic fluid pressurized by a hydraulic pump to be brought through appropriate tubings to corresponding hydraulic jacks 529 and 531 and thus increase the length of said jacks 529 and 531 in order to move arms 503 one toward the other.

Advantageously, for separating the trunk 711 form the stub with second means for cutting said trunk (see FIG. 17), arms 403 are pivoted around pin 410 from a position where knive 407 are spaced away form each other and free of any engagement with the trunk 711 toward a position where the cutting edge of knive 407 are very close form each other and, eventually one against the other. To pivot arms 403 around the pin 410, the operator sat in the cabin of the vehicule actuates, for a certain time, one or several valves, preferably simultaneously when more than one valve are actuated, in order to allow a hydraulic fluid pressurized by a hydraulic pump to be brought through appropriate tubings to corresponding jacks 425 and increase their length to move the cutting edge of knive 407 one toward the other in the trunk 711 until the trunk is separated for the stub. Then, the operator actuates, for a certain time, the valve(s) in order to allow a hydraulic fluid pressurized by a hydraulic pump to be brought through other appropriate tubings to corresponding jacks 425 and reduce their length to move the cutting edge of knive 407 away for each other.

Advantageously, grasping jaws 32 are moved slightly away from each other when the operator sat in the cabin of the vehicule actuates, for a certain time, one or several valves successivelly or preferably simultaneously, when more than one valve are actuated, in order to allow a hydraulic fluid pressurized by a hydraulic pump to be brought through appropriate tubings different from those involved for pressing of jaws 32 against trunk 711, to corresponding jacks 529 and 531 and thus reduce slightly the length of said jacks 529 and 531. When said jaws 32 are not pressed against the trunk 711, the foot of said trunk slids against the ground and then the head 3 is moved upwardly for a determined length when the operator sat in the cabin of the vehicule actuates, for a certain time, one or several valves simultaneously or successively when there is more than one valve that are actuated, in order to allow a hydraulic fluid pressurized by a hydraulic pump to be brought through appropriate tubing to corresponding hydraulic jacks 119, 143 and 221 and thus increase the length of jacks 119 and/or 143 and of jack 221 (see FIG. 18). Then, grasping jaws 32 are pressed against the trunk 711 when the operator sat in the cabin of the vehicule actuates, for a certain time, one or several valves, successively or, preferably simultaneously, when more than one valve are actuated, in order to allow a hydraulic fluid pressurized by a hydraulic pump to be brought through appropriate tubings to corresponding hydraulic jacks 529 and 531 and thus increase the length of said jacks 529 and 531 in order to move jaws 503 one toward the other and against the trunk 711.

Advantageously, for selectively moving and positioning booms 7, 9, first supporting member 75 and the head 3 around their respective pivoting axis and to bring the longitudinal axis of the trunk 711 substantially coaxial with the driving axis, the operator sat in the cabin of the vehicule actuates, for a certain time, one or several valves, simultaneously or successively when more than one valve are actuated, in order to allow a hydraulic fluid pressurized by a hydraulic pump to be brought through appropriate tubings to corresponding hydraulic jacks 119, 143, 221 and/or 381 and thus increase or reduce the length of one or several of them until the longitudinal axis of the trunk 711 is coaxial with the driving axis 700 with the foot facing the roller 701 mounted the platform 5. Of course, if necessary, the operator sat in the cabin has previouly actuated for a certain time, a vlave in order to allow a hydraulic fluid pressurized by a pump to be brought through appropriate tubings to the jack 745 in order to reduce its length and move the roller 701 mounted on the boom 705 away from the driving axis 700, so as when the foot of the trunk 711 is facing the roller 701 mounted on the platform, the operator could actuate, for a certain time, the valve in order to allow a hydraulic fluid pressurized by a pump to be brought to the jack 745 through tubings, different from those used to reduce the length of the jack 745, in order to increase the length of said jack 745 and press rollers 701 against the trunk 711 (see FIGS. 19 and 20).

Advantageously, grasping jaws 32 can be moved slightly away form each other in accordance with the steps set forth hereinbefore.

Advantageously, driving means 11 are started in pulling directing when the operator in the cabin actuates, one or several valves, preferably simultaneously, in order to allow a hydraulic fluid pressurized by a pump to be brought through appropriate tubings to hydraulic motors 751 in order to drive the trunk 711 between grasping jaws 32 and press branches against delimbing knive 507 and 635, and then actuating the valve to stop motors 751 (see FIG. 21).

Advantageously, grasping jaws 32 may be optionally moved one toward the other in order to grasp the trunk 711, in accordance with the steps set forth hereinbefore.

Advantageously, for separating the top of the tree from the trunk 711 with first means for cutting the trunk 711, arms 607 are pivoted around pins 615 from a position where the cutting edge of each knive 609 are spaced away from each other and free of any engagement with the trunk toward a position where the cutting edge of each knive are very close form each other and preferably one against the other. To pivot arm 607 around pins 615, the operator sat in the cabin actuates one or several valves, preferably simultaneously when more than one valve are actuated, in order to allow a hydraulic fluid pressurized by a pump to be brought through appropriate tubings to corresponding jacks 631 and increase their length to thus move cutting edge of knive 609 one against the other in the trunk 711 and until this trunk 711 is seperated from the top of the tree. Then, the operator actuates the valve(s) in order to allow a hydraulic fluid pressurized by a hydraulic pump to be brought through other appropriate tubings to corresponding jacks 631 and reduce their length to move cutting edge of knive 609 away form each other.

Advantageously, if grasping jaws 32 were optionally pressed against the trunk 711 before cutting of the top of the tree, said grasping jaws 32 are moved slightly away from each other in accordance with the steps forth hereinbefore.

Advantageously, driving means 11 are started in reverse or pushing direction when the operator in the cabin actuates, one or several valves, preferably simultaneously, in order to allow a hydraulic fluid pressurized by a pump to be brought through appropriate tubings different from those used to drive motors 751 into pulling direction, in order to drive the delimbed trunk 711 between grasping jaws 32 until the trunk 711 is out of engagement from rollers 701, and then the valve(s) are actuated to stop the motors 751. Optionally, the valve(s) can be actuated to stop motors 751 before the trunk 711 is out of engagement with rollers 701. Then, the operator actuates the valve allowing a hydraulic fluid pressurized by a pump to be brought through appropriate tubings to the jack 745 in order to reduce the length of jack said 745 and thus move the roller 701 mounted on the boom 705 away for the trunk 711.

Optionally, when driving means 11 are not sufficient to pull the trunk 711 against knive 507 and 635, the operator may actuate one or several valves, simultaneously or successively when more than one valve are actuated, in order to allow a hydraulic fluid pressurized by a hydraulic pump to be brought through appropriate tubings to corresponding jacks 119, 143, 221 and/or 381 to thus press branches on a short distance against knive 507 and 635. Of course, hydraulic motors 751 are stopped during this operation.

Such operation, for example, may allow to overcome a situation were the trunk 711 become jammed because a knife 507 or 635 engages a knot and motors 751 do not have enough power to force knife 507 or 635 through said knot.

Finally, the operator press grasping jaws 32 against the delimbed trunk 711 in accordance with steps set forth hereinbefore, then the operator moves and position booms 7,9, the supporting member 75 and/or the head 3 in accordance with steps set forth hereinbefore and/or move the platform and the vehicule to position the delimbed trunk 711 above a stack of delimbed trunks 711, and then grasping jaws 32 are moved away from each other in accordance with steps set forth hereinbefore when said jaws 32 were slightly moved away from each other except they are completely moved away from each other, and then the delimbed trunk 711 is released on the stack of trunks.

Thereafter, the apparatus is ready to process with another tree.

Of course, all aforesaid hydraulic pump may consist of only one hydraulic pump whose the outlet is connected to a plurality of tubings (i.e. at least as much tubings than those described hereinbefore).

As already stated throughout the above specification, because hydraulic pumps, valves and tubings used with hydraulic jacks, especially double action hydraulic jacks and hydraulic motor were well known in the art, it appears useless to describe them in details. Indeed, a man skilled in the art is perfectly aware of the specifications of those parts.

Of course, the present invention also extend to all structural characteristics that are equivalent to those described hereinbefore.

What is claimed is:

1. In a felling and delimbing apparatus of the type comprising:
  a head for felling and delimbing trees including:
    a frame,
    at least two grasping jaws pivotally mounted on said frame and movable toward or away from each other,
    means for selectively moving and positioning said grasping jaws toward or away from each other,
    delimbing knives mounted on said frame and on said grasping jaws, and
    first and second means for cutting the trunk of a tree, the first means being positioned above the grasping means while the second means is positioned under the grasping means;
  a platform pivotally mounted on a frame of a vehicle and means for moving the platform around a substantially vertical pivoting axis;
  first and second booms pivotally connected together by a first pivoting means defining a substantially horizontal pivoting axis, the first boom being also pivotally connected with the platform by a second pivoting means defining a substantially horizontal pivoting axis, the second boom being also pivotally connected with a first supporting member by a third pivoting means defining a substantially horizontal pivoting axis, the frame of the head and the first supporting member being connected together by a fourth pivoting means defining a pivoting axis that is substantially not parallel with aforesaid horizontal axis, and means adapted to selectively move and position the booms, the first supporting member and the head around their respective pivoting axis; and
  driving means for engaging the trunk of a tree having a longitudinal axis along a driving axis, when said driving axis is substantially coaxial with an axis intended to be substantially coaxial with the longitudinal axis of the trunk and substantially parallel with a longitudinal axis of the head and passing between grasping jaws, in order to allow branches of the tree to be pressed against delimbing knives and thus delimb the tree, wherein the frame of the head and the first supporting member are pivotally connected together by a fourth pivoting means defining a pivoting axis that is substantially not parallel with aforesaid horizontal axis, and means adapted to selectively move and position the booms, the first supporting member and the head around their respective pivoting axis and wherein the driving axis is substantially horizontal and driving means is mounted in such a way on the platform that movements of said booms, supporting member and head around their respective pivoting axis will allow to set the longitudinal axis of a trunk substantially coaxial with the driving axis and engage the driving means against this trunk.

2. An apparatus according to claim 1, wherein driving means comprise at least two rollers are distributed around the driving axis, at least one of said rollers being coupled with means for rotating the roller, and at least one of said rollers being movable substantially perpendicularly with respect to the driving axis between first and second positions, the first position being defined when at least one of said rollers is free of any engagement with the trunk of a tree, the second position being defined when all the rollers are pressed against the trunk of a tree.

3. An apparatus according to claim 1, wherein driving means comprise:
  a third and fourth booms pivotally connected together by a fifth pivoting means defining a substantially horizontal pivoting axis, the third boom being fastened on the platform, the fourth boom being provided with a third supporting member,
  two rollers distributed around and on substantially opposite sides of the driving axis, one of said rollers being pivotally mounted on a second supporting member which is itself mounted on the platform, said roller being coupled with means adapted to selectively drive it into clockwise or anti-clockwise rotation, the other of said rollers being pivotally mounted on the third supporting member and coupled with means adapted to selectively drive it into clockwise or anti-clockwise rotation, so that when one roller is rotated in a clockwise rotation, the other is rotated in a anti-clockwise rotation and vice-versa,
  means adapted to selectively move and position the fourth booms around the fifth pivoting means so as to either press the rollers against the trunk of a tree, in order to drive it forward or backward, or at least make the roller mounted on the third supporting member free of any contact with the trunk of the tree.

4. An apparatus according to claim 3, wherein ahead of the driving means is provided a guide comprising a member having first and second opposite ends, the first end thereof being mounted on the platform while the second end is defining a reverse "U", said "U" defining a plane substantially perpendicular with the driving axis, the intersection of the plane and the driving axis being located between branches of the "U".

5. An apparatus according to claim 3,
wherein
  the first and second booms are substantially movable according to a vertical plane; and
  rollers are positioned on the same side of said vertical plane and in such a way on the second and third supporting members that the driving axis converges toward and intersect the vertical plane at a point located within a span defined by said first and second booms.

6. An apparatus according to claim 5, wherein the rollers are further substantially positioned, when they are intended to be pressed against the trunk of a tree, in a plane that is inclined with respect to the horizontal and substantially parallel with the driving axis.

7. An apparatus according to claim 1, wherein the pivoting axis of the fourth pivoting means is at such an angle with respect to the pivoting axis of the third pivoting means that when both axis are in a same plane they make an angle equal or lesser than 90°.

8. An apparatus according to claim 7, wherein the angle is of about 50°, and wherein pivoting axis of the third and fourth pivoting means are diverging from each other toward the side of the vehicle where driving means are mounted.

9. An apparatus according to claim 6, wherein the pivoting axis of the fourth pivoting means is at such an angle with respect to the pivoting axis of the third pivoting means that when both axis are in a same plane they make an angle equal or lesser than 90°.

10. An apparatus according to claim 9, wherein the angle is of about 50°, and wherein the pivoting axis of the third and fourth pivoting means are diverging from each other toward the side of the vehicule where driving means are mounted.

11. An apparatus according to claim 10, wherein on one side of the platform is positioned a substantially horizontal table lying slightly underneath the driving axis and behind the driving means.

12. An apparatus according to claim 1, wherein the platform is further provided with means for allowing the platform to remain in a substantially horizontal position.

13. An apparatus according to claim 6, wherein each of said rollers are connected to a hydraulic motor.

14. A method for felling and delimbing a tree comprising the steps of:

providing an apparatus having a head for felling and delimbing trees and including:
a frame,
at least two grasping jaws pivotally mounted on said frame and movable toward or away from each other,
means for selectively moving and positioning said grasping jaws toward or away from each other, delimbing knives mounted on said frame and on said grasping jaws, and
first and second means for cutting the trunk of a tree, the first means being positioned above the grasping means while the second means is positioned under the grasping means;
a platform pivotally mounted on a frame of a vehicle and means for moving the platform around a substantially vertical pivoting axis;
first and second booms pivotally connected together by a first pivoting means defining a substantially horizontal pivoting axis, the first boom being also pivotally connected with the platform by a second pivoting means defining a substantially horizontal pivoting axis, the second boom being also pivotally connected with a first supporting member by a third pivoting means defining a substantially horizontal pivoting axis, the frame of the head and the first supporting member being connected together by a fourth pivoting means defining a pivoting axis that is substantially not parallel with aforesaid horizontal axis, and means adapted to selectively move and position the booms, the first supporting member and the head around their respective pivoting axis;
driving means for engaging the trunk of a tree having a longitudinal axis, said driving means having a substantially horizontal driving axis and being mounted on the platform;

positioning a tree between grasping jaws of the head, the longitudinal axis of the trunk of said tree is being allowed to be put in a substantially coaxial alignment with said driving axis by selective movements and positioning of booms, first supporting member and head around their corresponding pivoting axis;

positioning grasping jaws around and close the trunk of a tree, at the foot thereof, by selective movements and positioning of booms, of the first supporting member and of the head around their respective pivoting axis, and then sliding the head upwardly along a determined length of the trunk by selective movement and positioning of booms, of the first supporting member and of the head around their respective pivoting axis, to thus press branches of the tree against delimbing knives and delimbed a determined length of said tree, sliding down the head at the foot of the tree by selective movements and positioning of booms, of the first supporting member and of the head around their respective pivoting axis, moving grasping means against the trunk and separating the trunk for the stub with second means for cutting said trunk, moving grasping jaws slightly away from each other and by selective movements and positioning of booms, of the first supporting member and of the head around their respective pivoting axis, sliding the head upwardly along the trunk at a determined distance, and then moving grasping jaws again against the trunk, and by selective movements and positioning of booms, of the first supporting member and of the head around their respective pivoting axis, lifting the tree above the ground;

selectively moving and positioning the booms, the first supporting member and the head around their respective pivoting axis to bring the longitudinal axis of the trunk substantially coaxial with the driving axis, and to engage the foot of the trunk with by driving means;

moving grasping jaws slightly away from each other and starting driving means so as to pull the trunk between grasping jaws and press branches against delimbing knives to thus delimb another determined length of the tree, and then stopping driving means;

separating the trunk from the top of the tree with first means for cutting the trunk of the tree;

starting driving means in reverse direction to push the delimbed trunk between grasping jaws until the trunk is out of engagement by said driving means;

moving grasping means again against the trunk and by selective movement and positioning of the booms, the supporting member, the head and the platform around their respective pivoting axis, and positioning the trunk above a stack of trunks; and moving grasping means away from each other to release the trunk on the stack of trunks.

* * * * *